(12) United States Patent
Challoner

(10) Patent No.: US 7,793,541 B2
(45) Date of Patent: Sep. 14, 2010

(54) PLANAR RESONATOR GYROSCOPE CENTRAL DIE ATTACHMENT

(75) Inventor: A. Dorian Challoner, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/757,395

(22) Filed: Jun. 4, 2007

(65) Prior Publication Data
US 2008/0295622 A1  Dec. 4, 2008

(51) Int. Cl.
*G01P 9/04* (2006.01)
*G01P 1/02* (2006.01)
(52) U.S. Cl. .................... 73/504.13; 73/504.12; 73/493
(58) Field of Classification Search .............. 73/504.12, 73/504.13, 504.15, 504.04, 493, 431
See application file for complete search history.

(56) References Cited

U.S. PATENT DOCUMENTS

| | | | | |
|---|---|---|---|---|
| 6,094,984 A * | 8/2000 | Asano et al. ................... 73/493 |
| 6,360,601 B1 * | 3/2002 | Challoner et al. ......... 73/504.12 |
| 6,513,380 B2 * | 2/2003 | Reeds et al. ............. 73/504.12 |
| 6,944,931 B2 * | 9/2005 | Shcheglov et al. ............ 29/595 |
| 7,040,163 B2 | 5/2006 | Shcheglov et al. |
| 7,168,318 B2 | 1/2007 | Challoner et al. |
| 7,401,397 B2 * | 7/2008 | Shcheglov et al. ............ 29/595 |
| 2005/0017329 A1 | 1/2005 | Hayworth et al. |
| 2005/0274183 A1 | 12/2005 | Shcheglov et al. |
| 2006/0162146 A1 | 7/2006 | Shcheglov et al. |
| 2007/0084042 A1 | 4/2007 | Challoner et al. |

OTHER PUBLICATIONS

Pryputniewicz et al., "New Approach to Development of Packaging for MEMS Inertial Sensors," Proceedings of 2001 ASME Int. Mech. Eng. Cong. and Expo., Nov. 11-16, 2001, NY.

* cited by examiner

*Primary Examiner*—Helen C. Kwok
(74) *Attorney, Agent, or Firm*—Canady & Lortz LLP; Bradley K. Lortz

(57) ABSTRACT

Packaging techniques for planar resonator gyroscopes, such as disc resonator gyroscopes (DRGs) are disclosed. A gyroscope die may be attached to its package substrate on a central disc area that is inboard of its embedded electrodes. This configuration eliminates contact of the die with the package substrate beneath the embedded electrodes allowing the internal electrode support structure to expand or contract freely without stress as its temperature changes. The central attachment can also be used diminish the package temperature gradients on the periphery of the die, if the thermal conductivity of the central disc attachment material is higher than the package substrate. Temperature gradients across the resonator also lead to thermoelastic damping asymmetry and rate drift. In addition, the electrical connections to the die may be formed by vertical vias within the central disc attachment area or by thin wirebonds to peripheral I/O pads on the gyro chip.

20 Claims, 10 Drawing Sheets

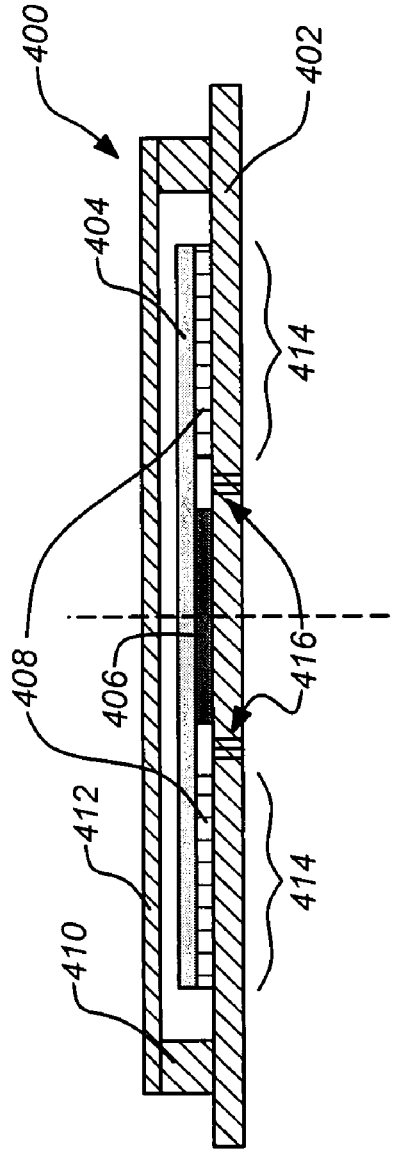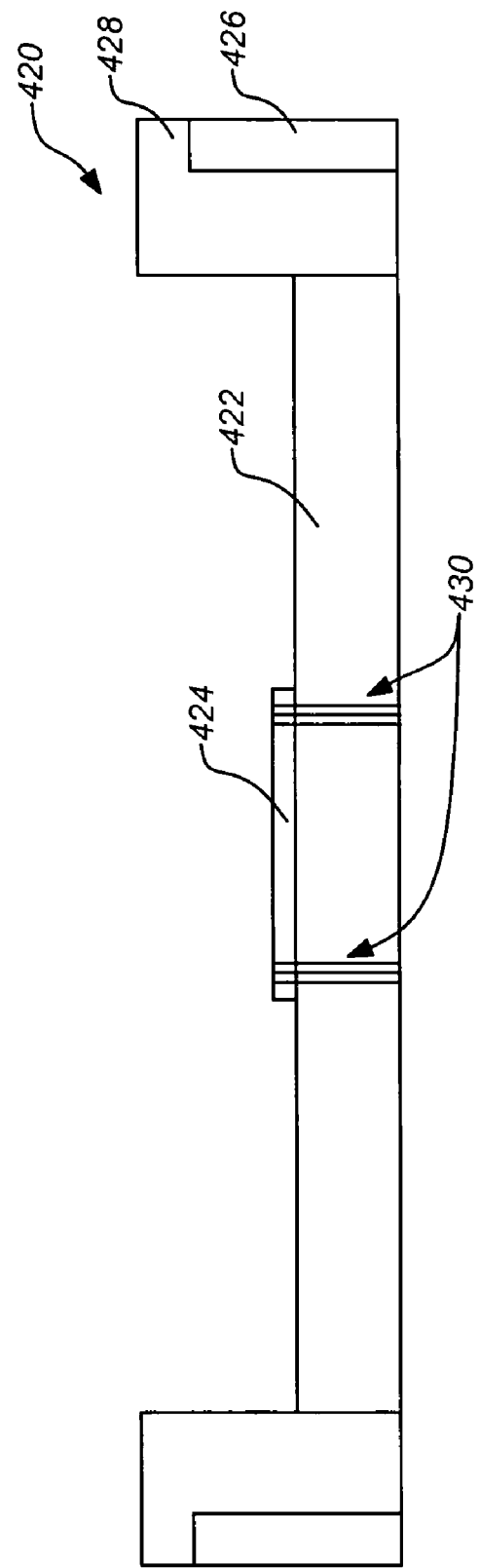

PLANAR RESONATOR GYROSCOPE CENTRAL DIE ATTACHMENT

CROSS-REFERENCE TO RELATED APPLICATIONS

This application is related to the following co-pending patent applications, which are both incorporated by reference herein:

U.S. patent application Ser. No. 11/371,596, filed Mar. 9, 2006, and entitled "ISOLATED PLANAR RESONATOR GYROSCOPE WITH INTERNAL RADIAL SENSING AND ACTUATION", by Kirill V. Shcheglov et al.; and U.S. patent application Ser. No. 11/199,004, filed Aug. 8, 2005, and entitled "INTEGRAL RESONATOR GYROSCOPE", by Kirill V. Shcheglov et al.

BACKGROUND OF THE INVENTION

1. Field of the Invention

The present invention relates to gyroscopes, and in particular to planar resonator gyroscopes or inertial sensors and their manufacturing. More particularly, this invention relates to the packaging of isolated planar resonator inertial sensors and gyroscopes.

2. Description of the Related Art

Mechanical gyroscopes are used to determine direction of a moving platform based upon the sensed inertial reaction of an internally moving proof mass. A typical electromechanical gyroscope comprises a suspended proof mass, gyroscope case, pickoffs, torquers and readout electronics. The inertial proof mass is internally suspended from the gyroscope case that is rigidly mounted to the platform and communicates the inertial motion of the platform while otherwise isolating the proof mass from external disturbances. The pickoffs to sense the internal motion of the proof mass, the torquers to maintain or adjust this motion and the readout electronics that must be in close proximity to the proof mass are internally mounted to the case which also provides the electrical feedthrough connections to the platform electronics and power supply. The case also provides a standard mechanical interface to attach and align the gyroscope with the vehicle platform. In various forms gyroscopes are often employed as a critical sensor for vehicles such as aircraft and spacecraft. They are generally useful for navigation or whenever it is necessary to autonomously determine the orientation of a free object.

Older conventional mechanical gyroscopes were very heavy mechanisms by current standards, employing relatively large spinning masses. A number of recent technologies have brought new forms of gyroscopes, including optical gyroscopes such as laser gyroscopes and fiberoptic gyroscopes as well as mechanical vibratory gyroscopes.

Spacecraft generally depend on inertial rate sensing equipment to supplement attitude control. Currently this is often performed with expensive conventional spinning mass gyros (e.g., a Kearfott inertial reference unit) or conventionally-machined vibratory gyroscopes (e.g. a Litton hemispherical resonator gyroscope inertial reference unit). However, both of these are very expensive, large and heavy.

Some symmetric vibratory gyroscopes have been produced, however their vibratory momentum is transferred through their cases directly to the vehicle platform. This transfer or coupling admits external disturbances and energy loss indistinguishable from inertial rate input and hence leads to sensing errors and drift. One example of such a vibratory gyroscope may be found in U.S. Pat. No. 5,894,090 to Tang et al. which describes a symmetric cloverleaf vibratory gyroscope design and is hereby incorporated by reference herein. Other planar tuning fork gyroscopes may achieve a degree of isolation of the vibration from the baseplate, however these gyroscopes lack the vibrational symmetry desirable for tuned operation.

In addition, shell mode gyroscopes, such as the hemispherical resonator gyroscope and the vibrating thin ring gyroscope, are known to have some desirable isolation and vibrational symmetry attributes. However, these designs are not suitable for or have significant limitations with thin planar silicon microfabrication. The hemispherical resonator employs the extensive cylindrical sides of the hemisphere for sensitive electrostatic sensors and effective actuators. However its high aspect ratio and three-dimensional curved geometry is unsuitable for inexpensive thin planar silicon microfabrication. The thin ring gyroscope (e.g., U.S. Pat. No. 6,282,958, which is incorporated by reference herein) while suitable for planar silicon microfabrication, lacks electrostatic sensors and actuators that take advantage of the extensive planar area of the device. Moreover, the case for this gyroscope is not of the same material as the resonator proof mass so that the alignment of the pickoffs and torquers relative to the resonator proof mass change with temperature, resulting in gyroscope drift.

Most recently, some planar resonator gyroscopes devices have been developed (such as a disc resonator gyroscope) which operate through the excitation and sensing of in-plane vibrational modes of a substantially solid planar resonator. These planar resonators obtain enhanced properties over designs such as the hemispherical or shell resonators by enabling greater drive and sensing area in a compact package that is more easily manufactured and packaged. For example, see U.S. Pat. No. 6,944,931 by Shcheglov et al., issued Sep. 20, 2005 and entitled "INTEGRAL RESONATOR GYROSCOPE" and U.S. Pat. No. 7,043,163 by Shcheglov et al., issued May 9, 2006 and entitled "ISOLATED PLANAR GYROSCOPE WITH INTERNAL RADIAL SENSING AND ACTUATION."

However, such planar resonator gyroscopes may benefit from alternate packaging designs. For example, planar resonator gyroscopes employing embedded capacitive electrodes may be sensitive to distortions arising between their supporting baseplate and planar resonator. Any distortions can affect the capacitive gaps and thus render negative consequences to the operation of the gyroscope, such as damping asymmetry and/or rate drift. Thermal gradients between different structural elements of a planar resonator gyroscope can be a primary contributor to capacitive gap nonuniformity. Conventional microelectronics and microelectromechanical systems (MEMS) manufacturing techniques, which are commonly employed in the development of planar resonator gyroscopes, call for applying a bond across the entire MEMS die to the package substrate. This bond or the package is often a dissimilar material to the MEMS die which can lead to differential expansion versus temperature between the MEMS die and package substrate. In turn, this may result in induced mechanical stress, warpage of the die and internal electrode gap nonuniformity which affect the performance of the gyroscope.

In view of the foregoing, there is a need in the art for improved packaging structures and methods for planar resonator gyroscopes, such as with conventional MEMS packaging techniques. Particularly, there is a need for such structures and methods to reduce thermal expansion differentials, mechanical stress, warpage and capacitive gap nonuniformity. However, there is a need for such structures and methods to be compatible with existing manufacturing methods and materials for planar resonator gyroscopes. As detailed below, the present invention satisfies these and other needs.

SUMMARY OF THE INVENTION

Packaging techniques for planar resonator gyroscopes, such as disc resonator gyroscopes (DRGs) are disclosed. A gyroscope die may be attached to its package substrate on a central disc area that is inboard of its embedded electrodes. This configuration eliminates contact of the die with the package substrate beneath the embedded electrodes allowing the internal electrode support structure to expand or contract freely without stress as its temperature changes, thus avoiding stress that would induce gap nonuniformity. A symmetric and highly conductive isothermal disc attachment area to a symmetric baseplate and resonator ensures symmetric spread of heat from the package substrate and resulting symmetric transient temperature distributions. If the package substrate is not an isothermal ground plane, the smaller central die attachment inherently diminishes the temperature gradient across the package from transmitting to the baseplate and resonator. The transmitted thermal gradient is further reduced if the thermal conductivity of the central disc attachment material is higher than the package substrate. Residual temperature gradients across the resonator also lead to thermoelastic damping asymmetry and rate drift. In addition, the electrical connections to the die may be formed by vertical vias within the central disc attachment area or by thin wirebonds to peripheral I/O pads on the gyro chip.

A typical embodiment of the invention comprises a packaged resonator gyroscope having a planar resonator die including a baseplate and a planar resonator centrally mounted to the baseplate having a plurality of embedded capacitive electrodes coupled to a top side of the baseplate, and a package substrate attached to a bottom side of the baseplate of the planar resonator die only in a symmetric central region substantially inboard of its embedded capacitive electrodes coupled to the top side of the baseplate. The package substrate is attached in a central region substantially excluded from a projected area of the plurality of embedded capacitive electrodes on the opposite side of the baseplate. The planar resonator may comprise a disc resonator and the disc resonator may be formed as a circumferentially slotted disc. In this case, the embedded capacitive electrodes may comprise one or more sense electrodes peripheral to one or more drive electrodes around the disc resonator.

In some embodiments, electrical connections to the planar resonator die may be made by vias through the central region. In addition, electrical connections to the planar resonator die may be made by thin wire bonds to peripheral I/O pads on the top of the baseplate.

In further embodiments, the planar resonator die may be attached to the bottom side of the baseplate with a solder or other bonding material. The bonding material may be cured to attach the package to the baseplate. Furthermore, thermal conductivity of the bonding material may be made higher than thermal conductivity of a substrate of the package attached to the planar resonator die to improve performance.

Similarly, a typical method embodiment of the invention comprises packaging a planar resonator gyroscope, by providing a planar resonator die including a baseplate and a planar resonator centrally mounted on the baseplate having a plurality of embedded capacitive electrodes coupled to a top side of the baseplate, providing a package for supporting the planar resonator die, and attaching the package to a bottom side of the baseplate of the planar resonator die only in a central region substantially excluded from a projected area of the plurality of embedded capacitive electrodes coupled to the top side of the baseplate. Method embodiments of the invention may be further modified consistent with the structures and techniques described herein.

BRIEF DESCRIPTION OF THE DRAWINGS

Referring now to the drawings in which like reference numbers represent corresponding parts throughout:

FIGS. 4A-4D illustrates an exemplary packaging process for an embodiment of the invention;

DETAILED DESCRIPTION OF THE PREFERRED EMBODIMENT

1. Overview

In the following description including the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Embodiments of the invention may be directed to packaging a planar resonator gyroscope such that a gyroscope die is attached to its package substrate on a central disc area that is inboard of its electrodes. A circular or symmetric disc having at least 8-fold symmetry may be preferred. This configuration can eliminate contact of the die with the package substrate in the area beneath the electrodes. This allows the internal electrode support structure to expand or contract freely without any stress as its temperature changes, thus avoiding stress that would induce gap nonuniformity.

Another benefit of using a central disc attachment is the opportunity to diminish the package temperature gradients on the periphery of a square or rectangular die. If the thermal conductivity of the central disc attachment material is made much higher than the package substrate then the temperature gradient across the disc attachment and hence the supported gyroscope resonator is greatly diminished. Temperature gradients across the resonator can also lead to thermoelastic damping asymmetry and rate drift. To preserve the benefits of this thermal-mechanical die interface, the electrical connections to the die are preferably made by vertical vias within the central disc attachment area or by thin wirebonds to peripheral I/O pads on the gyro chip.

Figure 1:
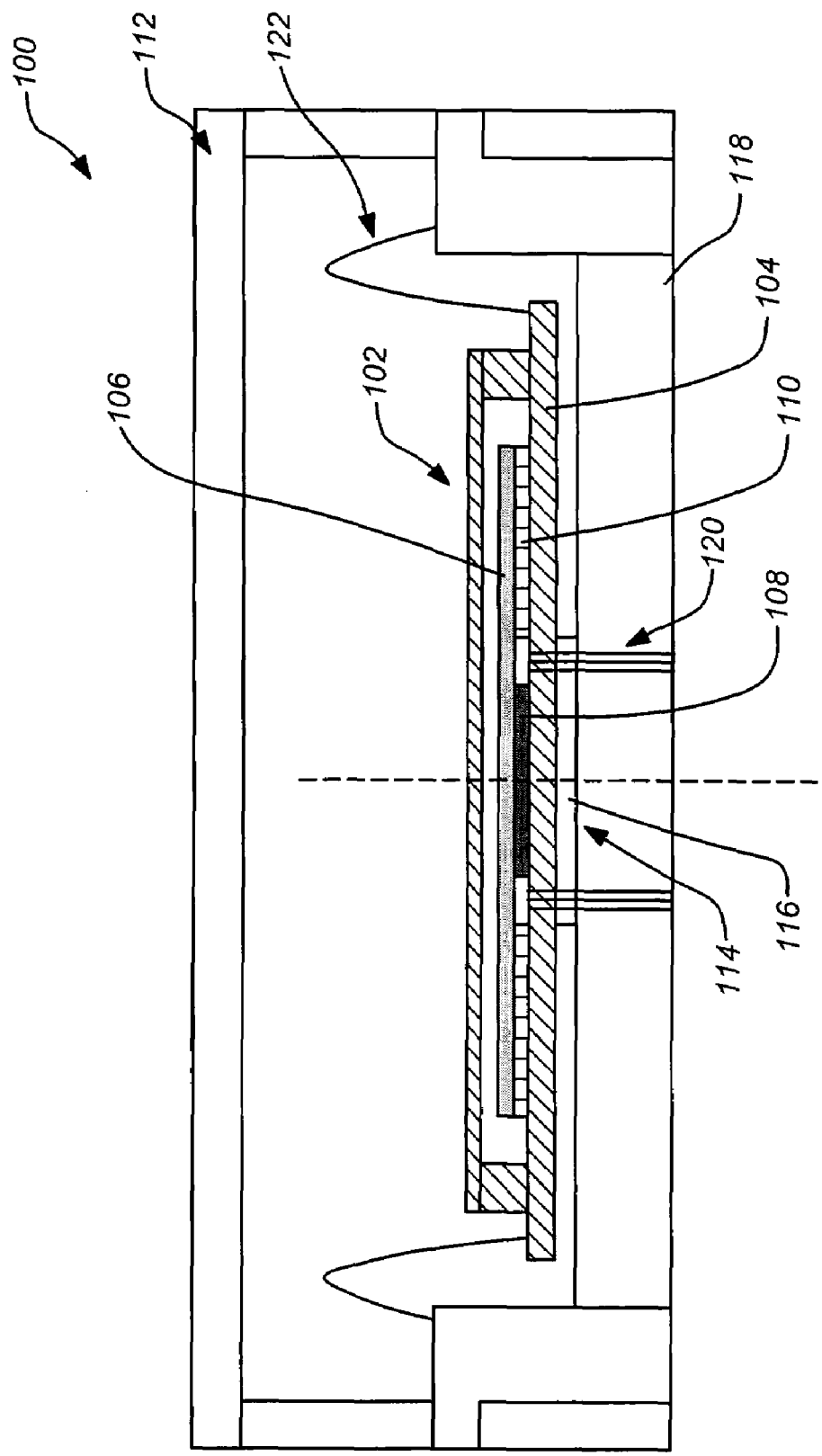
FIG. 1 illustrates and exemplary embodiment of the invention employing a DRG die centrally bonded to a package substrate.

FIG. 1 illustrates an exemplary packaged planar resonator gyroscope 100 in accordance with an embodiment of the invention. The planar resonator die 102 for sensing rotation includes planar resonator 106 mounted at a central point 108 onto a baseplate 104. Further, the baseplate 104 supports a plurality of capacitive electrodes 110 disposed around the central mounting point 108 of the planar resonator 106. The structure and operation of such a planar resonator gyroscope die 102 employing a disc resonator is further described in the next section. However, embodiments of the invention are applicable to any sensor design employing a centrally mounted planar resonator and embedded capacitive electrodes as will be understood by those skilled in the art. The bottom side of the baseplate 104 of the planar resonator gyroscope die 102 is attached to the package 112 in a central region 114 (similar to the central attachment of the resonator 106 to top side of the baseplate 104 of the die 102). In this case, the central region 114 is substantially excluded from a projected area to the bottom side of the baseplate 104 of the plurality of embedded capacitive electrodes 110 which are coupled to the top side of the baseplate 104. The attachment aids in thermally isolating the baseplate 104, particularly in the areas occupied by the embedded electrodes 110 on the top side of the baseplate 104. This reduces distortions that would affect capacitive gaps of the embedded electrodes 110 which would impact performance.

The attachment of the bottom side of the baseplate 104 to the package 112 may be made by a solder or bonding material 116 cured to a substrate 118 of the package 112. Further, performance of the packaged planar resonator gyroscope 100 may be improved if the thermal conductivity of the bonding material is higher (ideally, significantly higher) than that of the substrate 118 of the package 112.

Electrical connections to the embedded electrodes 110 on the die 102 can be made with wirebonds 122 attached to etched metal traces on the top side of the baseplate 104 (e.g., by peripheral I/O pads). In addition, electrical connections to the embedded electrodes 110 may also be made through vias 120 in the central region 114 (which may also be coupled to etched metal traces on the top side of the baseplate 104). The vias 120 may be coupled all the way through the bonding material 116 as well as the substrate 118 to the exterior of the package 112. Alternately, the vias 120 may be connected to etched metal traces on the top surface of the substrate 118 and coupled to the exterior from there (e.g., through a side wall of the package 112).

As previously mentioned, embodiments of the present invention can be applied to a planar resonator supported on a central rigid stem and with substantially increased sensing capability by utilizing a short solid cylindrical resonator or disc having a substantial useable internal resonator volume, allowing the incorporation of significantly more sensing for the measurement of desirable resonator internal motion. This use of a planar element, such as a disc, rather than a shell or ring, results in substantial top and bottom surface areas and a large internal volume for mounting additional sensors. A disc provides similar favorable radial modes as a cylindrical shell.

2. Exemplary Planar Resonator Gyroscope

Figure 2A:
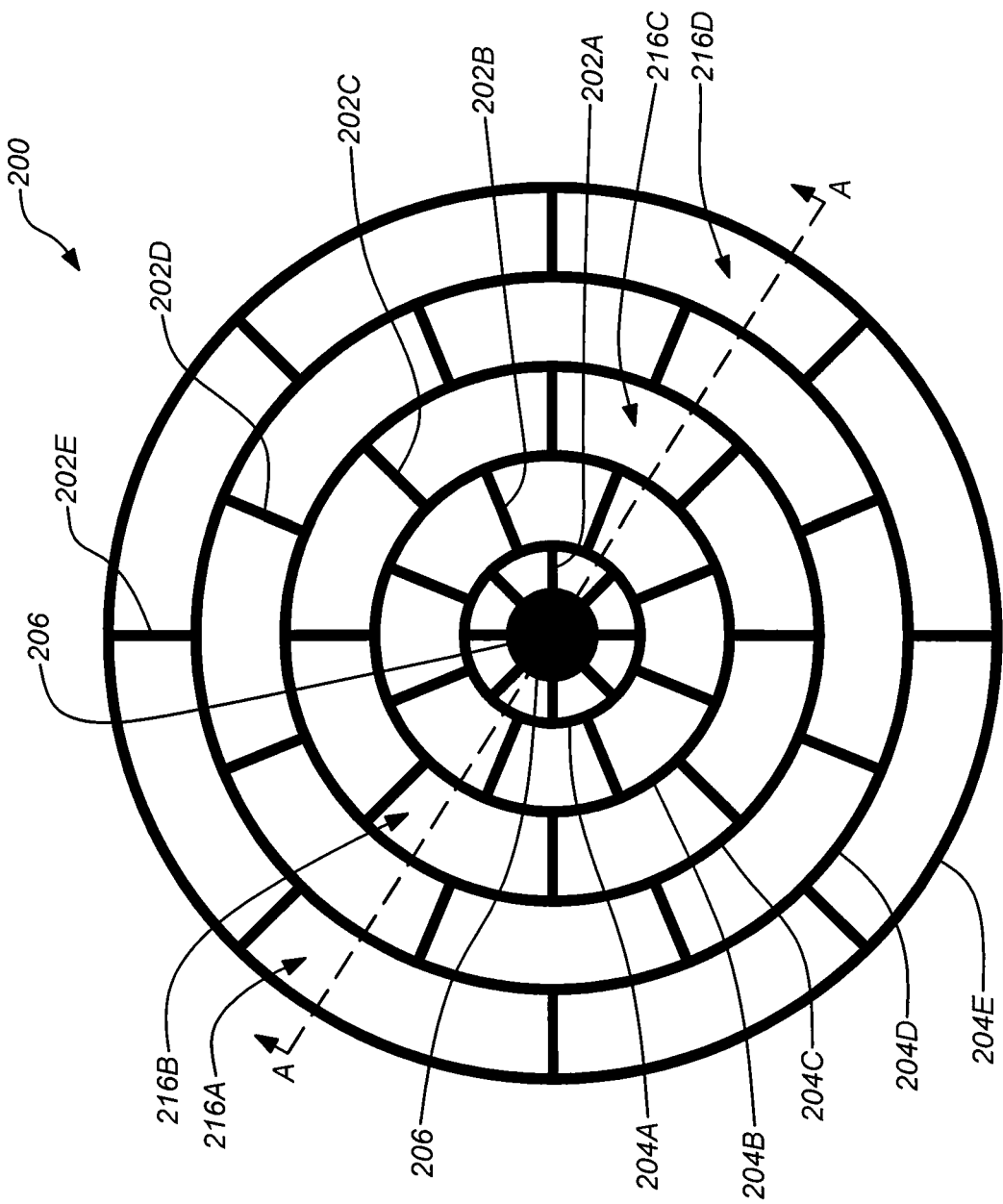
FIG. 2A depicts a schematic top view of an isolated resonator for the gyroscope or inertial sensor which may be operated in accordance with an embodiment of the invention.

FIG. 2A depicts a schematic top view of an isolated resonator for the gyroscope or inertial sensor which may be packaged according to an embodiment of the invention. The gyroscope comprises a unique planar resonator 200 which is supported by a rigid central support 206 and designed for in-plane vibration. In the exemplary embodiment, the resonator 200 comprises a disc that includes a number of slots, e.g. 216A-216D (generally referenced as 216) formed from concentric circumferential segments 104A-204E. The circumferential segments 204A-1204E are supported by radial segments 202A-202E. The overall diameter of the resonator can be varied depending upon the performance requirements. For example, a 16 mm diameter resonator can provide relatively high machining precision and low noise. Further refinement of the resonator can yield a resonator diameter of only 4 mm at significantly reduced cost.

Figure 2B:
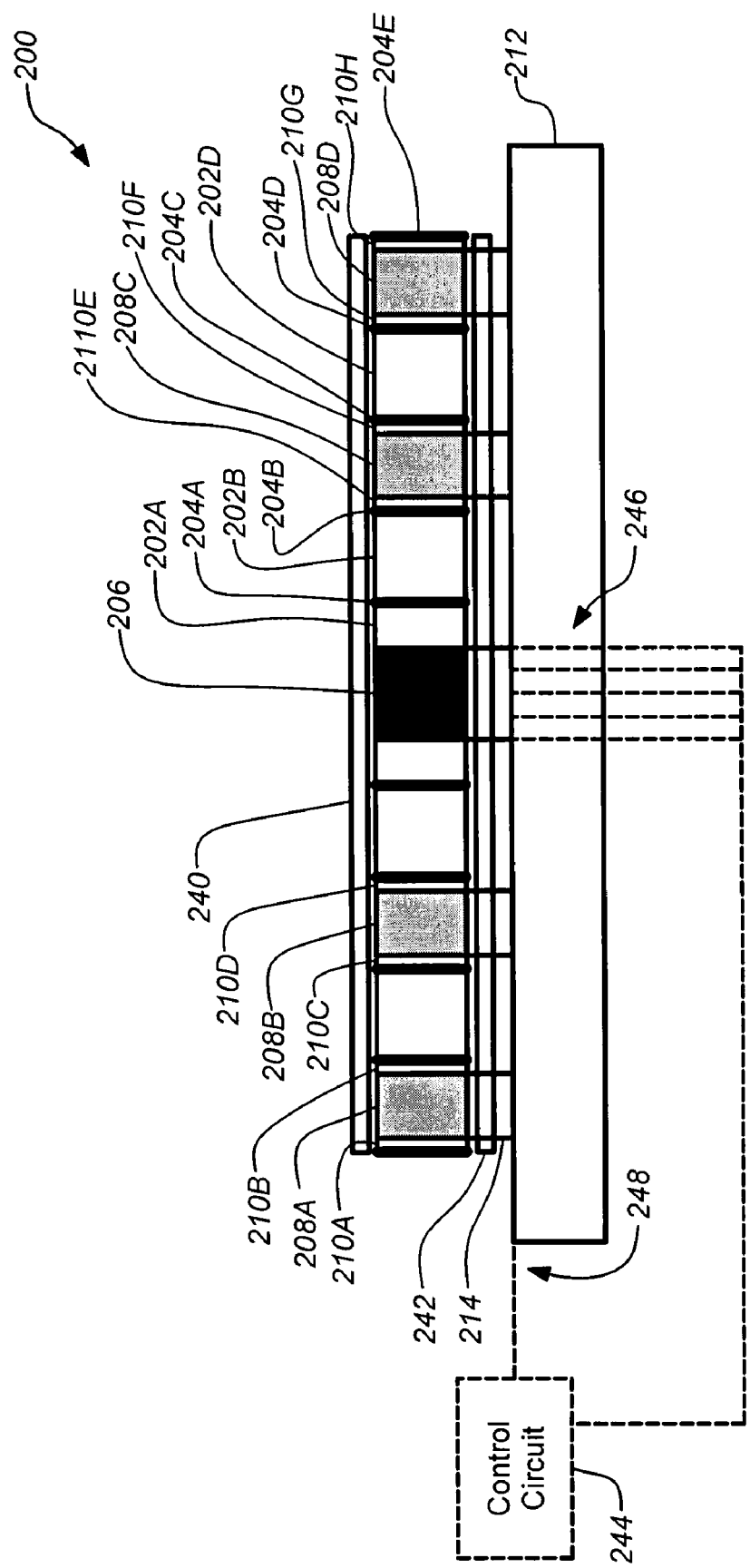
FIG. 2B depicts a side view of the exemplary planar resonator gyroscope of FIG. 2A.

FIG. 2B depicts a schematic side view of an exemplary isolated resonator 200 of the present invention assembled into a baseplate 212. The central support 206 supports the resonator 200 on the baseplate 212. At least some of the slots 216 in the resonator 200 provide access for the embedded electrodes 208A-208D which are also supported on pillars 214 on the baseplate 212. The electrodes 208A-208D form capacitive gaps 210A-210H (outboard gaps 210A, 210C, 210F and 210H and inboard gaps 210B, 210D, 210E and 210G) with at least some of the circumferential segments 204A-204E of the resonator 200. These electrodes 208A-208D provide for radial excitation of the resonator 200 as well as sensing motion of the resonator 200. To facilitate this each of the electrodes 208A-208D is divided into multiple separate elements to improve control and sensing of the resonator. For example, the annular electrode 208B as shown can be divided into two or more elements, at least one acting across the outboard gap 210C and at least one acting across the inboard gap 210D. Vibration is induced in the resonator by separately exciting the elements to produce a biased reaction on the resonator 200 at the electrode 208B location.

In general, the excitation electrodes 208B, 208C are disposed closer to the central support 206 (i.e., within inner slots of the resonator 200) than the electrodes 208A, 208D (i.e. within outer slots of the resonator 200) to improve sensing. However, the arrangement and distribution of the excitation and sensing electrodes 208A-208D can be varied as desired. In further embodiments, additional electrodes can also be used to bias the resonator 200 providing electrostatic tuning or trimming of nonuniformity. Such biasing electrodes can also include multiple separate elements as the excitation and sensing electrodes.

One or more additional electrodes 240, 242 may be disposed adjacent to the planar resonator 200. Although the electrodes 240, 242 are shown as single elements above and below the planar resonator 200, each electrode may comprise multiple distinct elements which may be independently controlled. The upper electrode 240 may be disposed on the inner surface of a housing (not shown in FIG. 2B) enclosing the resonator while the lower electrode 242 may be disposed on the baseplate 212. The lower electrode 242 is limited to the available area between the embedded electrodes 208A-208D and the rigid central support 206. The additional electrodes 240, 242 may be used to enhance control of the planar resonator 200. These capacitance electrodes 240, 242 may be used for axial or angular acceleration measurement as well as active damping of the axial and rocking modes of the disc resonator gyroscope.

Figure 3:
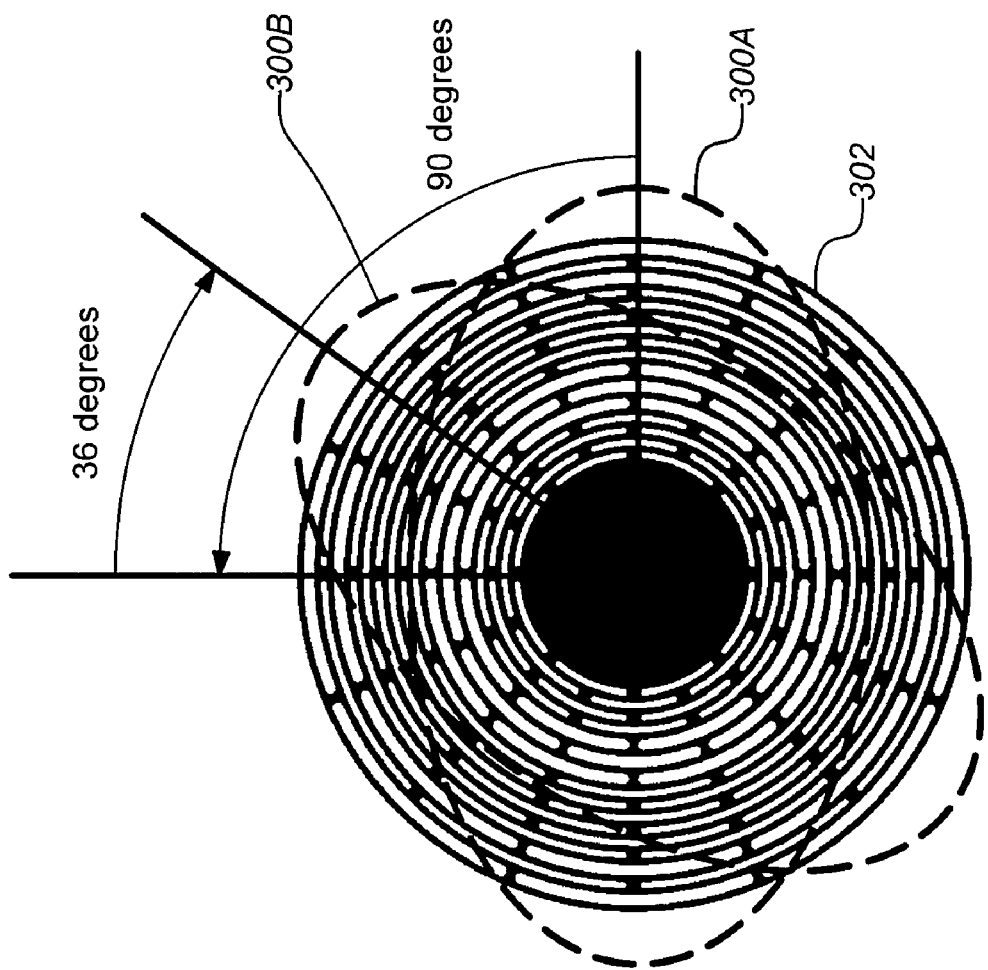
FIG. 3 illustrates the principle of operation of an exemplary disc resonator gyroscope.

Operation of the planar resonator 200, e.g. as part of a gyroscope, will be described with respect to FIG. 3 below. In general, the various electrodes (embedded in the resonator or adjacent to it) are used to drive vibration modes of the planar resonator as well as sense reactions in those modes to movement of the resonator with a control circuit 244 coupled to each electrode. Electrical connections to couple all the electrodes to the control circuit may be routed in any manner. For example, electrical connections may be provided by etched conductive traces on the surface of the baseplate 212 to wirebonds 248 from one edge of the baseplate 212. Alternately (or in addition) one or more of the electrical connections may be routed through vertical vias 246 through a central region of the baseplate 212. The design of the control circuit 244 may be readily developed by those skilled in the art in accordance with the teaching herein.

Figure 2C:
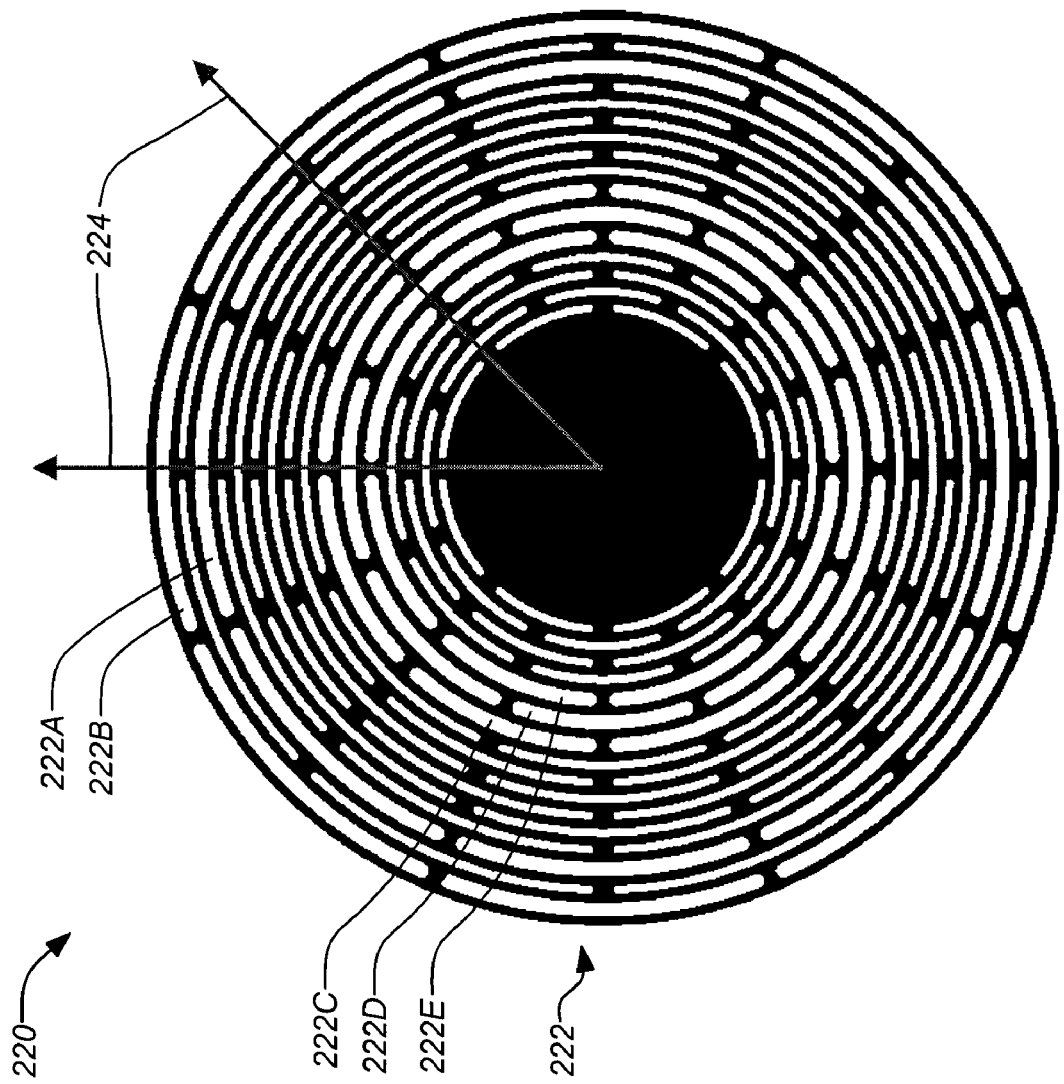
FIG. 2C illustrates a pattern for an exemplary planar resonator structure operable with an embodiment of the present invention.

FIG. 2C illustrates a pattern 220 for an exemplary planar resonator 200 of the present invention. This pattern 220 employs numerous concentric interleaved circumferential slots 222. Some of the slots, e.g. 222A-222E are wider to accommodate multiple element electrodes. For example, two of the outer rings of wider slots 222A, 222B are for the sensing electrodes and three of the inner rings of wider slots are for the driving electrodes. The remaining slots 222 can serve to structurally tune the resonator 200 (e.g., lower the frequency) and/or they may be occupied by bias electrodes which are used to actively bias the resonator in operation. The resonator and modal axes 224 are indicated; operation of the resonator identifies them because the pattern 220 is symmetric.

Although the exemplary resonator 200 is shown as a disc, other planar shapes and geometries using internal sensing and actuation with embedded electrodes are also possible applying principles of the present invention. In addition, furthermore, the single central support 206 is desirable, providing complete isolation of the resonator, however, other mounting configurations using one or more additional mounting supports are also possible.

As employed in the resonator 200 described above, a centrally supported solid cylinder or disc has two degenerate in-plane radial modes suitable for Coriolis sensing, however the frequencies are very high (greater than 100 KHz) and the radial capacitance sensing area diminishes with cylinder height or disc thickness. However, the multi-slotted disc resonator 200, shown in FIGS. 2A and 2B overcomes these problems. By etching multiple annular slots through the cylinder or disc two immediate benefits result: two degenerate modes suitable for Coriolis sensing with low frequency (less than 50 KHz) and large sense, bias and drive capacitance. The low frequency derives from the increased radial compliance provided by the slots. The large sense, bias and drive capacitance is a consequence of the large number of slots that can be machined into the resonator.

Figure 2D:
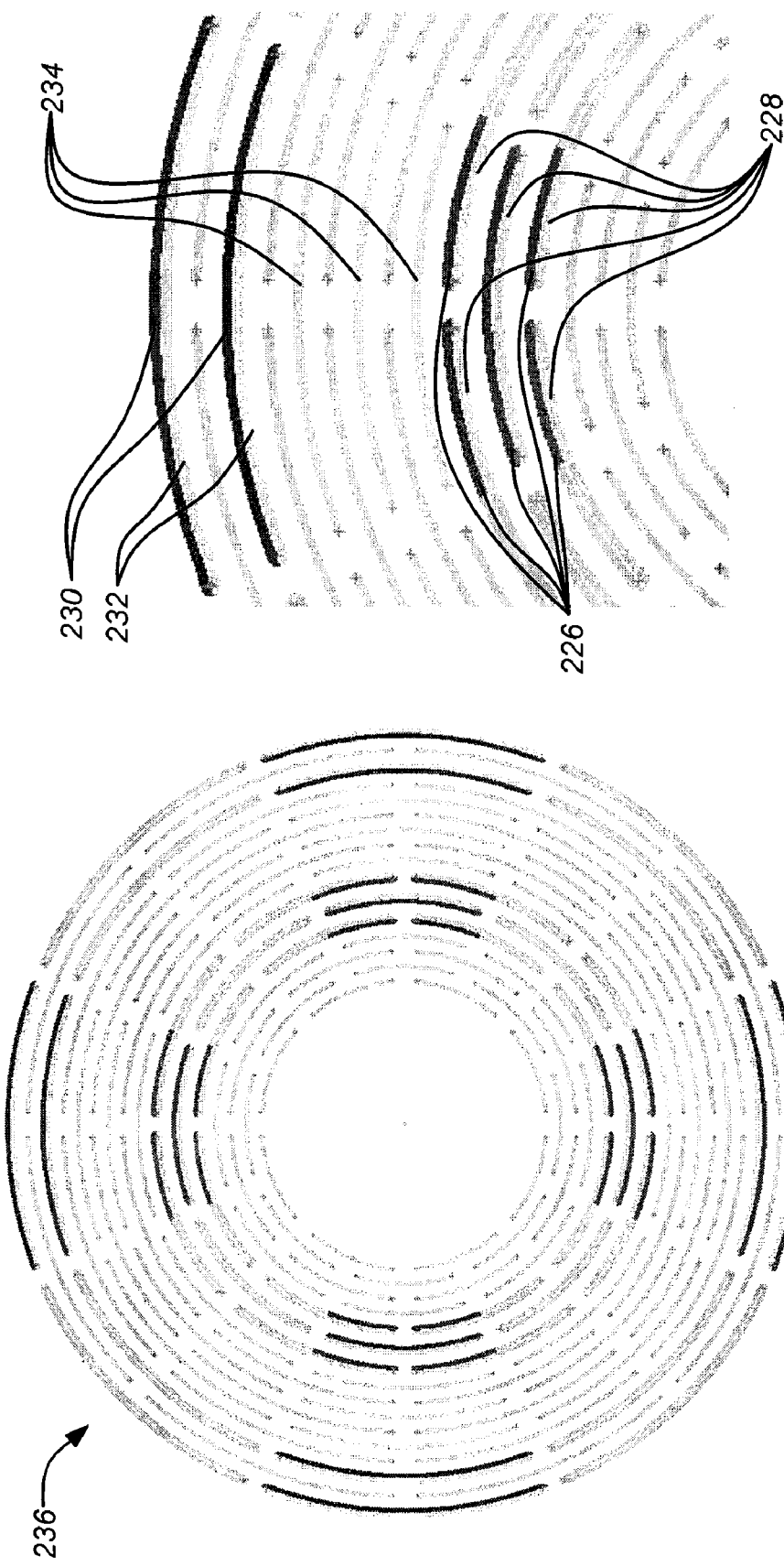
FIG. 2D illustrates conventional electrode operation for a first differential mode of the exemplary resonator.

FIG. 2D illustrates conventional electrode operation for a first differential mode of the resonator of FIG. 2C. The electrodes 136 that operate with a resonator 200 of the pattern 220 are shown in the left image. Four groups of electrodes 224 are used, each at a 90° interval around the circumference of the pattern. The negative excitation elements 226 and positive excitation elements 228, paired elements of the excitation electrodes, are driven to excite the resonator 200. These paired elements 226, 228 share a slot with the negative elements 226 in the outboard position and the positive elements 228 in the inboard position. Note also that as shown some of the pairs share a common slot with other distinct electrode pairs, illustrating that multiple separately operable electrodes can share a common resonator slot. The sensing electrodes are disposed at a larger radial position and include negative sensing elements 230 and positive sensing elements 232 which together provide output regarding motion of the resonator 200.

A uniform radial spacing between slots 216, 222 can be employed, but other spacing may also be used, provided two degenerate radial modes suitable for Coriolis sensing are maintained. In addition, in further embodiments, some or all of the segments 204A-204E can be further slotted such that a single beam segment is further divided into a composite segment including multiple parallel segments. Selective use of such composite segments can be used to adjust the frequency of the resonator as well as eliminate harmful thermoelastic effects on drift performance as the segments are stressed in operation of the resonator. Generally, adding slots to form composite circumferential segments lowers the resonator frequency. The effect of machining errors is also mitigated with multiple slots. Although such composite segments are preferably applied to the circumferential segments 204A-204E, the technique can also be applied to the radial segments 202A-202E or other designs with other segments in other resonator patterns.

Employing the in-plane design described, embodiments of the present invention obtain many advantages over other out-of-plane gyros. For example, the central support bond carries no vibratory loads, eliminating any friction possibility or anchor loss variability. In addition, simultaneous photolithographic machining of the resonator and electrodes is achieved via the slots. Furthermore, diametral electrode capacitances can be summed to eliminate vibration rectification and axial vibration does not change capacitance to a first order. Modal symmetry is also largely determined by photolithographic symmetry not wafer thickness as with other designs. Isolation and optimization of sense capacitance (e.g., from the outer slots) and drive capacitance (e.g., from the inner slots) is achieved. Embodiments of the invention also achieve a geometric scalable design to smaller or larger diameters and thinner or thicker wafers. In addition, embodiments of the invention can be entirely defined by slots of the same width for machining uniformity and symmetry. Implementation of the present invention can also accommodate silicon anisotropy producing frequency splits. For example, a <111> silicon wafer and/or a varied slot width can be used.

As mentioned above, high thermoelastic damping due to vibration frequency proximity to thermal relaxation resonance can result in short resonance decay times and high gyro drift. However, the slot radial spacing can be adjusted to define an optimum beam width and a number of slots can be additionally etched in between the slots defining the electrode gaps to further reduce the vibrating beam width.

FIG. 3A illustrates the principle of operation of an exemplary disc resonator gyroscope (such as described in FIGS. 2A-2C). The mode is elliptically-shaped and reactionless relative to the rigid central support of the disc resonator 202. This mode is excited at a fixed vibration amplitude and when an inertial rotation is applied as shown in FIG. 3A, its precession is observed via the segmented capacitive electrodes embedded within and adjacent to the interconnected rings that comprise the disc resonator 302 structure. The amount of precession is a precise geometrically-defined fraction of the inertial rotation. In the example shown, the standing wave vibration pattern is illustrated in a first position 300A before the case of the disc resonator 302 is rotated. As the case fixed to the centrally supported disc resonator 302 is rotated ninety degrees as indicated, the precession shifts the standing wave vibration pattern to the second position 300B (approximately thirty-six degrees clockwise in the example).

Generally, vibratory gyroscopes actively control at least one vibratory Coriolis mode to vibrate at constant amplitude. A second, nearby output Coriolis mode may be either actively forced to zero amplitude or allowed to freely vibrate in order to sense the Coriolis force produced by the combination of the first mode vibration and an input inertial rate along an axis normal to the plane of vibration. A closed loop force to rebalance the amplitude to zero or the open loop precession are indicative of the input inertial rate.

3.0 Packaging of a Planar Resonator Gyroscope

Embodiments of the invention are directed to a new technique for packaging a planar resonator gyroscope to obtain improved performance. Embodiments of the invention are described hereafter with respect to a disc resonator gyroscope (DRG). However, embodiments of the invention are not limited to disc resonator gyroscopes. Those skilled in the art will appreciate that embodiments of the invention are similarly applicable to the packaging of gyroscopes based on other planar resonators applying the same principles.

Figure 4C:
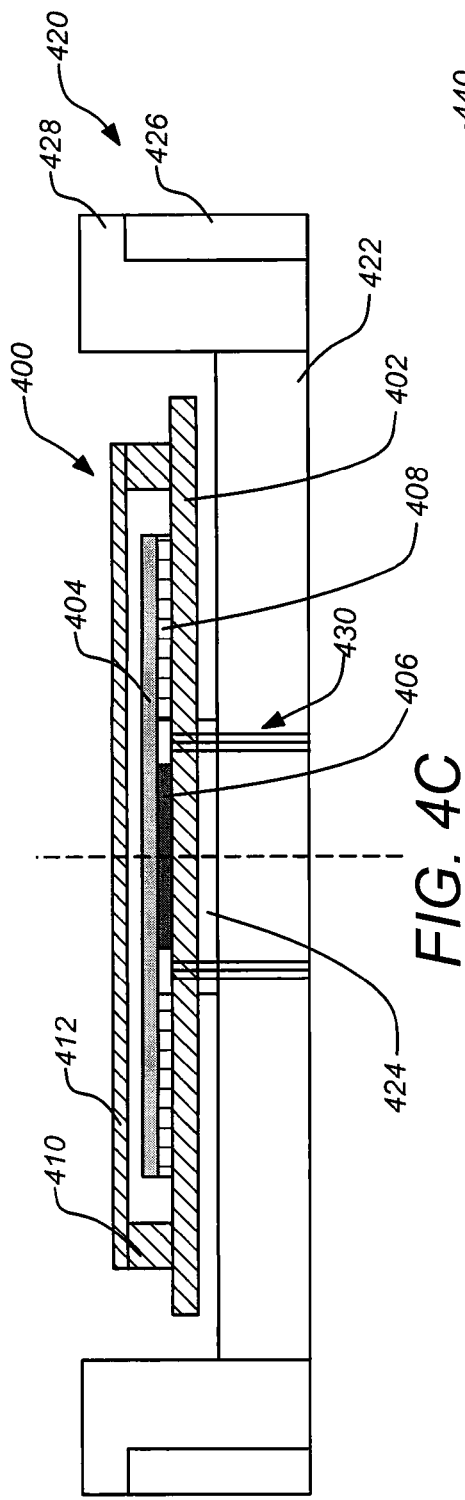

FIGS. 4A-4D illustrates an exemplary packaging process for a planar resonator die 400 in an embodiment of the invention. FIG. 4A illustrates the completed planar resonator die 400 which includes a planar resonator 404 (e.g., a disc resonator) affixed to a baseplate 402 at a central point 406. In addition, the planar resonator 404 includes embedded capacitive electrodes 408 which are attached to the baseplate 402 and electrically coupled to etched metal traces (not shown) on the top surface of the baseplate 402. Projected areas 414 onto the bottom side the baseplate 402 of the embedded capacitive electrodes 408 on the top side are shown. The planar resonator die 400 may be manufactured using any known MEMS processes and materials. For example, the baseplate 402 and/or resonator 404 may be constructed from silicon and/or quartz. Furthermore, the die 400 may be enclosed by sidewalls 410 and a capping wafer 412 in some embodiments. This capping wafer 412 may be centrally bonded to the resonator prior to resonator etch or to provide additional rigidity. Although a complete enclosure is not required at this level, one is often employed to prevent particle contamination or to provide an integral vacuum case. In some embodiments, the baseplate 402 may be prepared with vias 416 through a central region to provide electrical connections through the baseplate 402. The vias 416 are excluded from the projected areas 414 (i.e., within the central region).

FIG. 4B illustrates a portion of the package 420 prepared for receiving the planar resonator die 400. The package 420 includes a substrate 422 to support the planar resonator die 400. A bonding material 424 may be attached to the substrate 422 in preparation for the attachment. In addition, contacts and electrical connections may be configured on the package 420 to connect the embedded capacitive electrodes 408 of the die 420 to the exterior of the package 420. This may be accomplished in a number of ways. For example, some or all the electrical connections may be picked up on the sidewalls 428 and then coupled to an electrical contact area 426 on the exterior of the package 420. In addition, some or all the electrical connections may be routed through vias 430 through the bonding material 424. The vias 430 may stop at the top surface of the substrate 422 connected to etched metal traces or pass through the substrate 422 to electrical connections on the bottom of the substrate. Similar to the planar resonator die 400, the package may be produced using known MEMS process and materials or conventional electronics packaging methods. For example, the resonator die 400 may be attached with a gold-tin solder disc perform to package 420 which may be constructed from an LCC ceramic.

FIG. 4C illustrates the planar resonator die 400 of FIG. 4A attached to the package 420 of FIG. 4B. The planar resonator die 400 is aligned and then affixed to the bonding material 424 of the package 420. The bonding material 424 may be cured to achieve proper attachment. For example, the attachment should be adequately rigid, e.g., at least 45 kHz rocking mode resonance and provide adequate vertical clearance between the rest of the die and the package to allow for any bond misalignment.

Figure 4D:
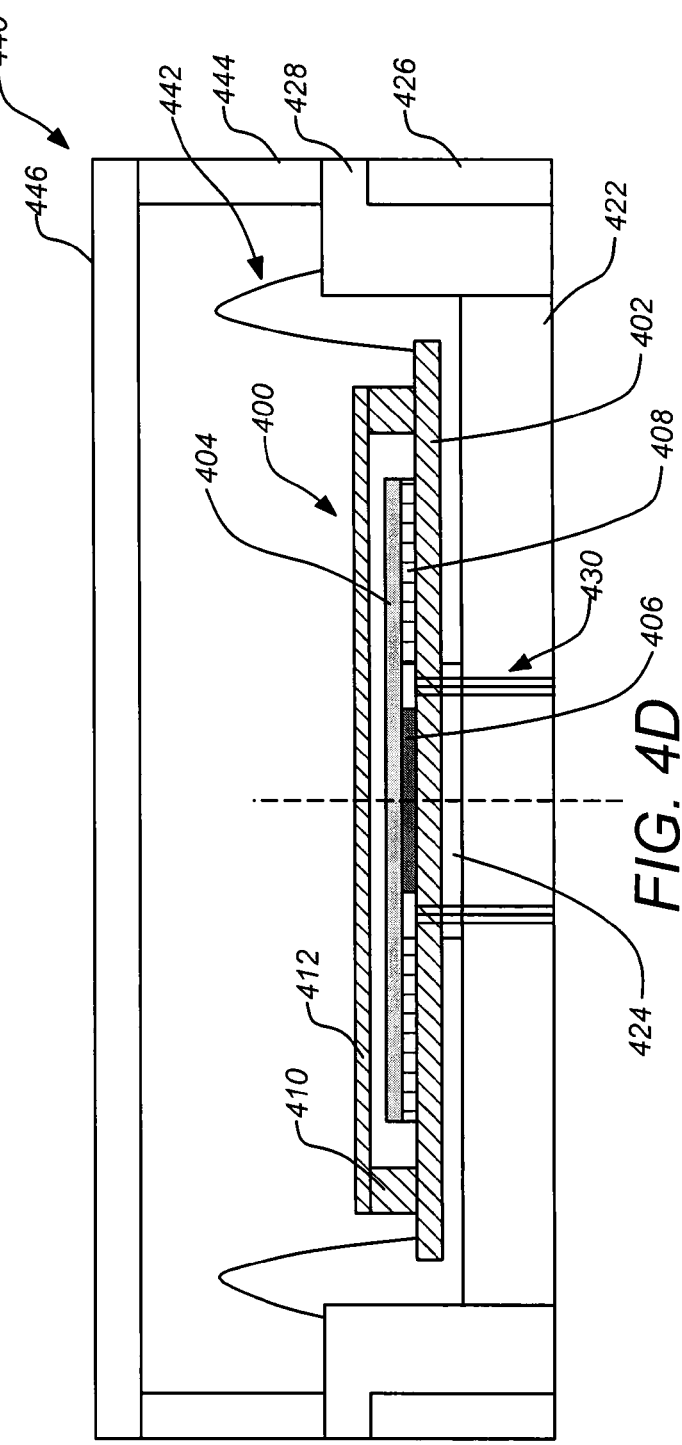

FIG. 4D illustrates the completed package 440 enclosing and attached to the planar resonator die 400. To complete the package 440, any electrical connections from periphery of the die 400 may be completed with wirebonds 422 from the baseplate 402 to the contacts on the package 440. Additional sidewalls 444 and a metal lid 446 can be used to fully enclose the planar resonator die 400. The package may vacuum sealed with a solder seal ring on the metal lid 446. The metal lid 446 may also include a getter material as is commonly used in vacuum sealed devices.

Figure 4E:
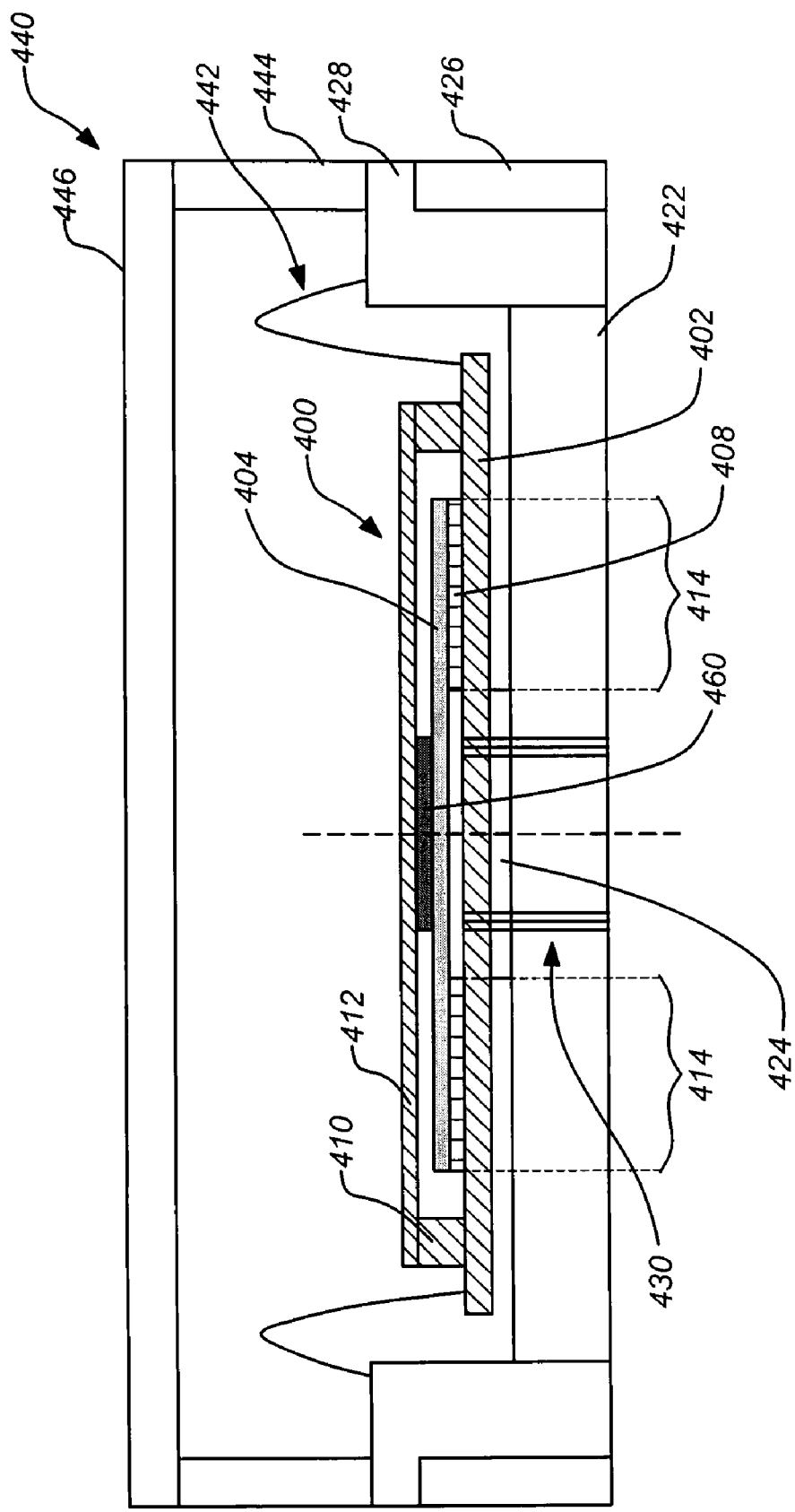
FIG. 4E illustrates the exemplary packaging process for an embodiment of the invention where the resonator is mounted to the baseplate through the capping wafer.

FIG. 4E illustrates the exemplary packaging process for an embodiment of the invention where the planar resonator 404 is mounted to the baseplate 402 through the capping wafer 412. The packaging process is essentially identical to the process outlined in FIGS. 4A-4D. However, in this case the planar resonator die 400 comprises a planar resonator 404 that is mounted to the baseplate 402 through the capping wafer 412 (and sidewalls 410) instead of being mounted directly onto the baseplate 402 as shown in the previous embodiments. In this case, the attachment to the capping wafer is still a central attachment, but a top central point 460. Thus, it can be seen that it is not critical how the planar resonator 404 is attached to the baseplate 402, only that it is attached and that the bottom side of the baseplate 402 is attached to the package 420 only in a central region substantially excluded from a projected area 414 of the plurality of embedded capacitive electrodes coupled to the top side of the baseplate 402. As used herein, mounting to the baseplate 402 only requires that a rigid structural path is provided to the baseplate 402. The path may be direct mounting on the top side of the baseplate 402 or through the capping wafer 412 as shown in FIG. 4E. Although mounting to the baseplate 402 in the latter way may make manufacturing the resonator die 400 more difficult, more area is created in the central region to form vias 430 more easily (or form a greater number of vias 430). Alternatively, central mounting of the resonator to both the baseplate 402 and capping wafer 412 provides additional structural rigidity.

Figure 5:
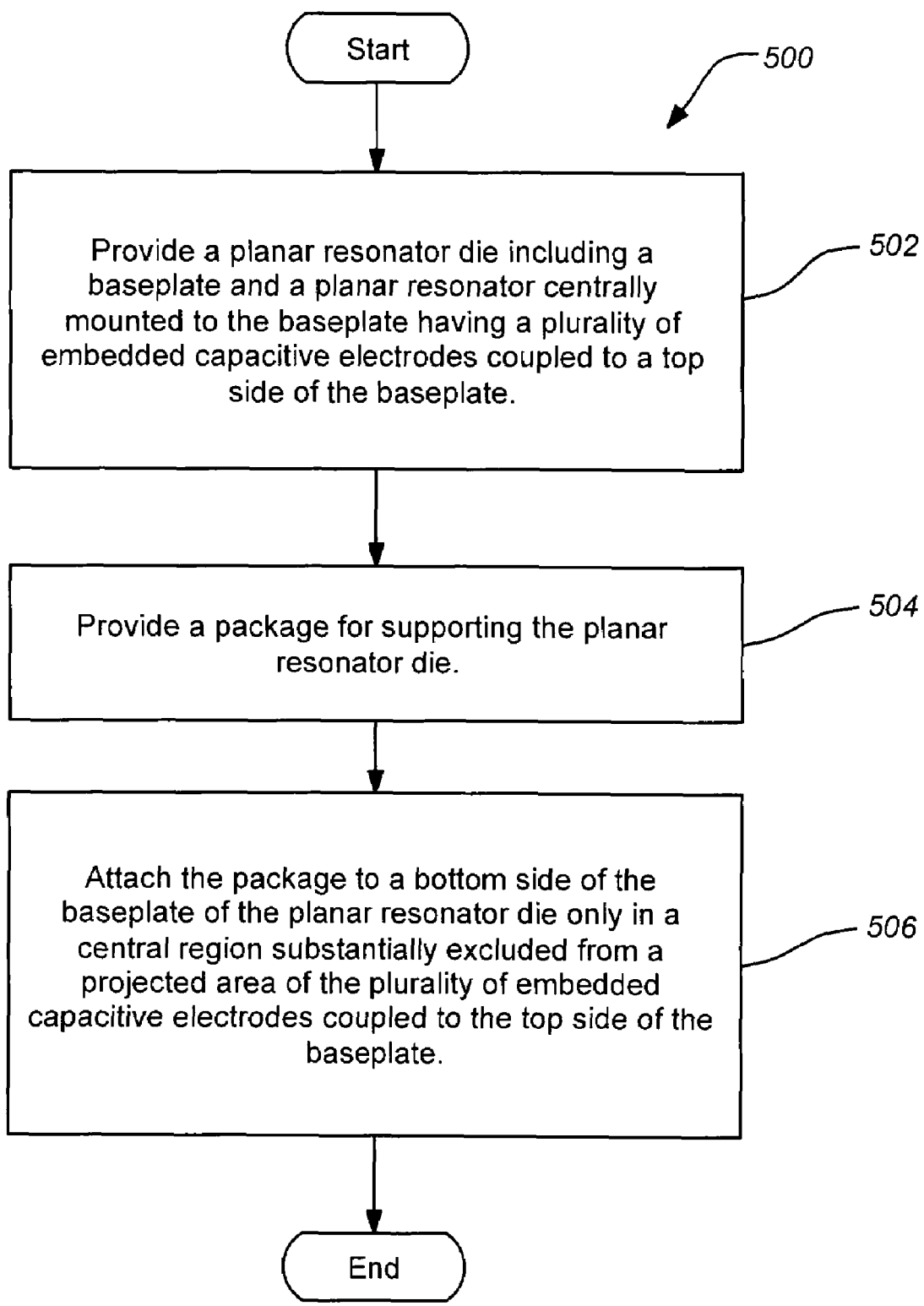
FIG. 5 is a flowchart of an exemplary method of packaging a planar resonator gyroscope according to the present invention.

FIG. 5 is a flowchart of an exemplary method 500 of packaging a planar resonator gyroscope according to the present invention. The method 500 begins with an operation 502 of providing a planar resonator die including a baseplate and a planar resonator centrally mounted on the baseplate having a plurality of embedded capacitive electrodes coupled to a top side of the baseplate. Next in operation 504, a package for supporting the planar resonator die is provided. Finally, in operation 506, the package is attached to a bottom side of the baseplate of the planar resonator die only in a central region substantially excluded from a projected area of the plurality of embedded capacitive electrodes coupled to the top side of the baseplate. This basic method 500 may be further modified as described above. For example, the method may include an operation of applying a performed disc of solder or bonding material to the package to attach the planar resonator die to the bottom side of the baseplate. The package may be heated to flow the solder or cure the bonding material to attach the package to the baseplate.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the invention. Since many embodiments of the invention can be made without departing from the scope of the invention, the invention resides in the claims hereinafter appended.

What is claimed is:

1. A packaged resonator gyroscope, comprising:
a planar resonator die including a baseplate and a planar resonator centrally mounted to the baseplate having a plurality of embedded capacitive electrodes coupled to a top side of the baseplate; and
a package attached to a bottom side of the baseplate of the planar resonator die only in a central region substantially excluded from a projected area of the plurality of the embedded capacitive electrodes coupled to the top side of the baseplate to avoid stress that would induce gap nonuniformity of the embedded capacitive electrodes under temperature changes;
wherein the plurality of the embedded capacitive electrodes are within slots in the planar resonator.

2. The packaged resonator gyroscope of claim 1, wherein the planar resonator comprises a disc resonator.

3. The packaged resonator gyroscope of claim 2, wherein the disc resonator comprises a circumferentially slotted disc.

4. The packaged resonator gyroscope of claim 3, wherein the embedded capacitive electrodes comprise one or more sense electrodes peripheral to one or more drive electrodes around the disc resonator.

5. The packaged resonator gyroscope of claim 1, wherein electrical connections to the planar resonator die are made by vias through the central region.

6. The packaged resonator gyroscope of claim 1, wherein electrical connections to the planar resonator die are made by thin wire bonds to peripheral I/O pads on a DRG chip.

7. The packaged resonator gyroscope of claim 1, wherein the planar resonator die is attached to the bottom side of the baseplate with a bonding material.

8. The packaged resonator gyroscope of claim 7, wherein the bonding material is cured to attach the package to the baseplate.

9. The packaged resonator gyroscope of claim 7, wherein thermal conductivity of the bonding material is higher than that of a substrate of the package attached to the planar resonator die.

10. A method of packaging a planar resonator gyroscope, comprising the steps of:
providing a planar resonator die including a baseplate and a planar resonator centrally mounted to the baseplate having a plurality of the embedded capacitive electrodes coupled to a top side of the baseplate;
providing a package for supporting the planar resonator die; and
attaching the package to a bottom side of the baseplate of the planar resonator die only in a central region substantially excluded from a projected area of the plurality of the embedded capacitive electrodes coupled to the top side of the baseplate to avoid stress that would induce gap nonuniformity of the embedded capacitive electrodes under temperature changes;
wherein the plurality of the embedded capacitive electrodes are within slots in the planar resonator.

11. The method of claim 10, wherein the planar resonator comprises a disc resonator.

12. The method of claim 11, wherein the disc resonator comprises a circumferentially slotted disc.

13. The method of claim 12, wherein the embedded capacitive electrodes comprise one or more sense electrodes peripheral to one or more drive electrodes around the disc resonator.

14. The method of claim 10, wherein electrical connections to the planar resonator die are made by vias through the central region.

15. The method of claim 10, wherein electrical connections to the planar resonator die are made by thin wire bonds to peripheral I/O pads on a DRG chip.

16. The method of claim 10, further comprising applying a bonding material to the package to attach the planar resonator die to the bottom side of the baseplate.

17. The method of claim 16, further comprising curing the bonding material to attach the package to the baseplate.

18. The method of claim 16, wherein thermal conductivity of the bonding material is higher than that of a substrate of the package attached to the planar resonator die.

19. A packaged resonator gyroscope, comprising:
a planar resonator die means for sensing rotation including a baseplate and a planar resonator centrally mounted to the baseplate having a plurality of embedded capacitive electrodes coupled to a top side of the baseplate;
a package means for supporting the planar resonator die means; and
a bonding means for attaching the package means to a bottom side of the baseplate of the planar resonator die means only in a central region substantially excluded from a projected area of the plurality of the embedded capacitive electrodes coupled to the top side of the baseplate to avoid stress that would induce gap nonuniformity of the embedded capacitive electrodes under temperature changes;
wherein the plurality of the embedded capacitive electrodes are within slots in the planar resonator.

20. The packaged resonator gyroscope of claim 19, wherein electrical connections to the planar resonator die means are made by vias through the central region, the bonding means and the package means.

* * * * *